United States Patent
Hiratsuka et al.

(10) Patent No.: US 6,823,659 B2
(45) Date of Patent: Nov. 30, 2004

(54) MOISTURE REMOVAL DEVICE AND METHOD THEREOF FOR INTERNAL COMBUSTION ENGINE USE EXHAUST GAS CLEANING DEVICE

(75) Inventors: Toshifumi Hiratsuka, Hitachinaka (JP); Norihiro Shinotsuka, Hitachinaka (JP); Osamu Kuroda, Hitachi (JP); Yuichi Kitahara, Hitachinaka (JP); Takeshi Inoue, Hitachinaka (JP); Ryouta Doi, Naka (JP); Hidehiro Ilzuka, Hitachinaka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/347,257

(22) Filed: Jan. 21, 2003

(65) Prior Publication Data

US 2003/0172646 A1 Sep. 18, 2003

(30) Foreign Application Priority Data

Jan. 22, 2002 (JP) ........................................ 2002-012488
Mar. 19, 2002 (JP) ........................................ 2002-075392
Aug. 9, 2002 (JP) ........................................ 2002-232269

(51) Int. Cl.[7] .............................................. F01N 3/00
(52) U.S. Cl. ........................................ 60/277; 60/309
(58) Field of Search ........................ 60/274, 277, 297, 60/300, 309

(56) References Cited

U.S. PATENT DOCUMENTS 5,300,265 A * 4/1994 Banks et al. ................. 422/172
5,524,432 A * 6/1996 Hansel .......................... 60/274
5,678,403 A * 10/1997 Kanehara et al. ............. 60/309
5,716,586 A * 2/1998 Taniguchi ..................... 422/173
6,357,227 B1 * 3/2002 Neufert ......................... 60/309
6,598,387 B2 * 7/2003 Carberry et al. .............. 60/297

FOREIGN PATENT DOCUMENTS

JP          05-256124      * 10/1993
JP          04-158425         6/1995
JP          11-006424      *  1/1999

* cited by examiner

Primary Examiner—Thomas Denion
Assistant Examiner—Diem Tran
(74) Attorney, Agent, or Firm—Crowell & Moring LLP

(57) ABSTRACT

A moisture removal device for an internal combustion engine use exhaust gas purifying device with a trapped moisture amount estimation means which estimates amount of moisture exhausted from an internal combustion engine and trapped in the catalyst, a judgement means which judges whether the estimated value of the trapped moisture amount exceeds a predetermined amount, and means for controlling removal of the moisture trapped in the catalyst, wherein when the estimated value of moisture trapped in the catalyst exceeds the predetermined value, a control of removing the moisture in the catalyst is performed. Whereby, since the moisture trapped by the catalyst can be removed and a possible elution of the catalyst components can be prevented, reduction of exhaust gas purifying performance of the catalyst can be prevented.

4 Claims, 14 Drawing Sheets

| $T_a$ | $T_{a1}$ | $T_{a2}$ | $T_{a3}$ | $T_{a4}$ |
|---|---|---|---|---|
| C | $C_1$ | $C_2$ | $C_2$ | $C_3$ |
| $T_{as}$ | $T_{as1}$ | $T_{as2}$ | $T_{as3}$ | $T_{as4}$ |
| CB | $CB_1$ | $CB_2$ | $CB_3$ | $CB_4$ |

$T_{a1} < T_{a2} < T_{a3} < T_{a4}$
$C_1 > C_2 > C_3 > C_4$
$T_{as1} < T_{as2} < T_{as3} < T_{as4}$
$CB_1 < CB_2 < CB_3 < CB_4$

MOISTURE REMOVAL DEVICE AND METHOD THEREOF FOR INTERNAL COMBUSTION ENGINE USE EXHAUST GAS CLEANING DEVICE

This application claims the priority of Japanese Patent Document Nos. 2002-012488 and 2002-075392, filed Jan. 22, 2002, and Mar. 19, 2002, respectively, the disclosures of which are expressly incorporated by reference herein.

BACKGROUND OF THE INVENTION

1. Field of the Invention

The present invention relates to an exhaust gas purifying device and method for an internal combustion engine.

2. Conventional Art

Generally, when a motor vehicle use exhaust gas purifying catalyst such as a lean NOx catalyst and a three-way catalyst excessively traps therein moisture exhausted from the internal combustion engine thereof, soluble components in the catalyst sometimes elute and the purifying performance thereof sometimes reduces.

For this reason, for example, JP-A-7-158425 (1995) proposes to estimate moisture deposition amount on NOx catalyst from exhaust gas based on the amount of fuel fed to an internal combustion engine and to accumulate the same, and then to estimate deterioration of the NOx catalyst, and JP-A-11-6424 (1999) proposes to estimate moisture amount adsorbed on an HC adsorbent and to effectively perform a post treatment of HC released from the HC adsorbent in accordance with temperature rising speed variation of the HC adsorbent which varies depending on the amount of moisture.

However, the above referred to conventional art does not go beyond the estimation of the amount of trapped moisture in the catalyst and not relate to removal of the trapped moisture.

Accordingly, the conventional exhaust gas purifying devices caused the following problem, in that when the temperature of the catalyst does not rise more than the moisture evaporation temperature such as in a short time operation immediately after starting the internal combustion engine, the moisture generated does not evaporate and remains in the catalyst, thereby, if such short time operation is repeated, the moisture accumulates in the catalyst and soluble components in the catalyst elute which reduces the purifying performance of the catalyst.

SUMMARY OF THE INVENTION

In view of the above problems, an object of the present invention is to provide a device and a method which estimate amount of moisture trapped in the catalyst and remove the moisture trapped in the catalyst.

In order to resolve the above object, the present invention is provided with a trapped moisture amount estimation means which estimates amount of moisture exhausted from an internal combustion engine and trapped in a catalyst, a judgement means which judges whether the estimated value of the trapped moisture amount exceeds a predetermined amount, and means for controlling removal of the moisture trapped in the catalyst, wherein when the estimated value of moisture trapped in the catalyst exceeds the predetermined value, removal of the moisture in the catalyst is performed.

DETAILED EXPLANATION OF EMBODIMENTS

Figure 1:
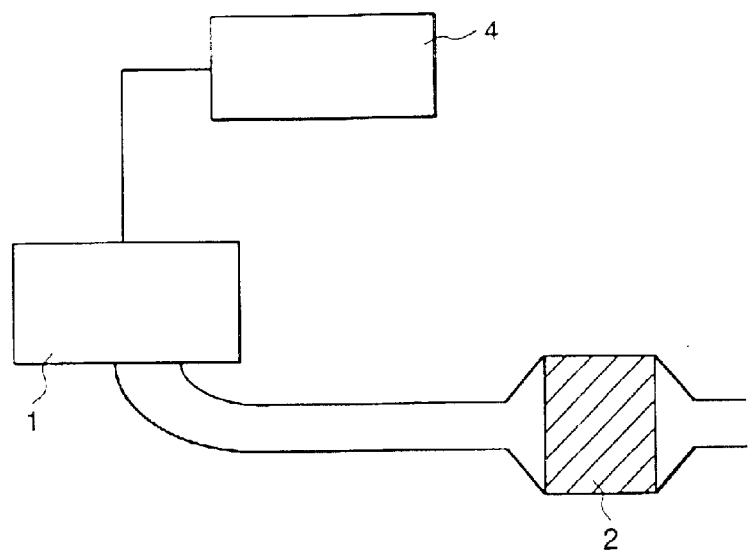
FIG. 1 is a constitutional diagram of an exhaust gas purifying device representing an embodiment of the present invention.

The present inventors studied a characteristic of trapping moisture in combustion exhaust gas by a catalyst and a characteristic of releasing the trapped moisture therefrom during the start of the internal combustion engine. As a result of the study, it was clarified that the moisture trapping by the catalyst is almost unrelated to the exhaust gas temperature at the inlet of the catalyst. The moisture trapping occurs when the temperature of the catalyst and of the exhaust gas at exhaust gas downstream side of the catalyst is below a predetermined temperature of about 80–100° and the moisture trapping by the catalyst advances depending on time after the start of the internal combustion engine. Further, it was also clarified that when operations in which the temperature of the catalyst is below the predetermined temperature of about 80–100° are repeated, the amount of moisture is accumulated in the catalyst. Still further, it was also clarified that the catalyst temperature and the exhaust gas temperature at the exhaust gas downstream portion in the catalyst, in other words the amount of trapped moisture is related to the operation time of the internal combustion engine from activation to stoppage thereof.

According to the above knowledge, the present invention is characterized in that the trapped moisture amount estimation means counts number of times of continued operations in which the maximum catalyst temperature from activation to stoppage of the internal combustion engine is below a predetermined temperature and judges whether or not the counted value reaches a predetermined number of times to thereby estimate amount of moisture trapped by the catalyst.

The trapped moisture amount estimation means according to the present invention may be modified to count number of times of continued operations in which the maximum exhaust gas temperature at the downstream portion of the catalyst from activation to stoppage of the internal combustion engine is below a predetermined temperature or the activation time of the internal combustion engine from activation to stoppage thereof is below a predetermined time interval and to judge whether or not the counted value reaches a predetermined number of times to thereby estimate amount of moisture trapped by the catalyst.

The present inventors further studied a characteristic of releasing moisture trapped by the catalyst during the start of the internal combustion engine. As a result of the study, it was clarified that the releasing of the trapped moisture advances according to temperature increase of inleting exhaust gas as well as temperature increase of the catalyst relating thereto, the temperature of the catalyst during the moisture releasing stays near the temperature of about 80–100°, the temperature of the catalyst escapes from the staying temperature region after almost completing the moisture releasing and rises suddenly as well as the temperature of the exhaust gas at the downstream of the catalyst escapes from the staying temperature region and rises suddenly, and the moisture releasing advances depending on time. Further, it is also clarified that the sudden increase of the temperature, in other words the completion of moisture release is related to the internal combustion engine activation time period from activation to stoppage thereof.

According to the above knowledge, the present invention is characterized in that the moisture removing operation by the trapped moisture removing means is continue d until the temperature of the catalyst or the temperature of the exhaust gas at the catalyst in the exhaust gas downstream portion reaches a predetermined temperature. Further, the operation can be performed for a predetermined time interval.

The present invention is further characterized in that the trapped moisture removing means is effected through no load operation control of the internal combustion engine. In the no load operation control the temperature of the exhaust gas of the internal combustion engine can be increased higher than that in a usual no load operation. Further, the trapped moisture removing means can be provided with a heated wind generating device or a blower device disposed at the exhaust gas upstream portion for the catalyst to supply the heated wind or the blowing wind into the catalyst.

The trapped moisture removing means can perform the wind blow into the catalyst with a pump. The wind blowing into the catalyst can also be performed either by storing air in a pressure vessel by the pump during activation of the internal combustion engine or by activating the pump with the power of the internal combustion engine.

Further, the trapped moisture removing means can be realized by providing a heating means at the catalyst and by supplying wind blow into the catalyst while heating the same. The catalyst heating means can be realized with an electrically heated catalyst. The electrically heated catalyst includes one in which a heating means is provided at a part of the catalyst and further one in which through the heat of the electrically heated catalyst the catalyst positioned at the downstream is heated and dried.

The trapped moisture amount estimation means which estimates the trapped moisture amount based on the activation time of the internal combustion engine corrects the trapped moisture amount depending on outside air temperature of the internal combustion engine and causes to operate the trapped moisture removing means based on the corrected trapped moisture estimation amount. Further, more than one trapped moisture removing means can be used in parallel. The activation of the trapped moisture removing means can be performed immediately after stopping the operation of the internal combustion engine. Further, before the count value of number of continued operation times reaches the predetermined number of times, the exhaust gas temperature of the internal combustion engine from activation to stoppage thereof can be rised higher than that in a usual operation thereof to shorten the predetermined time interval of the internal combustion engine operation time. The exhaust gas purifying use catalyst can be a lean NOx catalyst which can effectively remove NOx in the exhaust gas even in an oxygen rich atmosphere.

Hereinbelow, the present invention will be explained with reference to specific examples, however, the present invention is not limited to these embodiments.

A performance of the present invention was confirmed under a condition that moisture is collected in a lean NOx catalyst 2 by making use of a motor vehicle of a lean burn gasoline engine having a cubic capacity of 1.5L. In order to collect moisture in the catalyst the engine activation-stoppage is repeated so as to accumulate moisture in the catalyst.

The moisture accumulation amount was evaluated by the weight variation (moisture amount) of the catalyst before and after the engine activation-stoppage repetition test.

The lean NOx catalyst is, for example, composed by the followings.

The lean NOx catalyst is a composition composed by metals or metal oxides (or complex oxides) constituted by at least one kind of alkaline metals selected from such as lithium (Li), potassium (K) and sodium (Na), at least one of alkaline earth metals such as magnesium (Mg), calcium (Ca), strontium (St) and barium (Ba), rare earth metals such as cerium (Ce), metals in 1Va group in element periodic table such as titanium (Ti) and zirconium (Zr), metals in Va group such as vanadium (V) and niobium (Nb), metals in VIa group such as molybdenum (Mo) and tungsten (W), metals in VIIa group such as manganese (Mn), metals in iron group such as iron (Fe), cobalt (Co) and nickel (Ni), metals in group IIIb such as copper (Cu), zinc (Zn), aluminum (Al) and gallium (Ga), and metals in 1Vb group such as silicon (Si) and tin (Sn), and at least one noble metal selected from such as platinum (Pt), rhodium (Rh), palladium (Pd), ruthenium (Ru) and iridium (Ir); and the above composition or a composition which carries the above composition on a porous heat resistant metal oxide such as alumina, is carried on a metal substrate.

Further, with regard to capacity of the lean NOx catalyst in the embodiment, 1.4L was used for a single use of the lean NOx catalyst and 1.0L was used for combined use with an electrically heated catalyst.

In contrast to the lean NOx catalyst, the electrically heated catalyst is a cylindrical shape having 0.4L capacity in which the catalyst component is carried on a metal honeycomb being provided with electrodes at the center and the most outer circumference thereof. Further, the same carrying method and the same amount and composition of the carried component were used as those of the above lean NOx catalyst. The present catalyst was secured inside a stainless steel vessel while being electrically insulated therefrom.

An exhaust gas purifying device representing an embodiment 1 of the present invention is shown in FIG. 1. A lean NOx catalyst 2 is arranged at the downstream side of an engine 1, and the engine 1 is coupled to a control unit which permits engine operation control.

Figure 2:
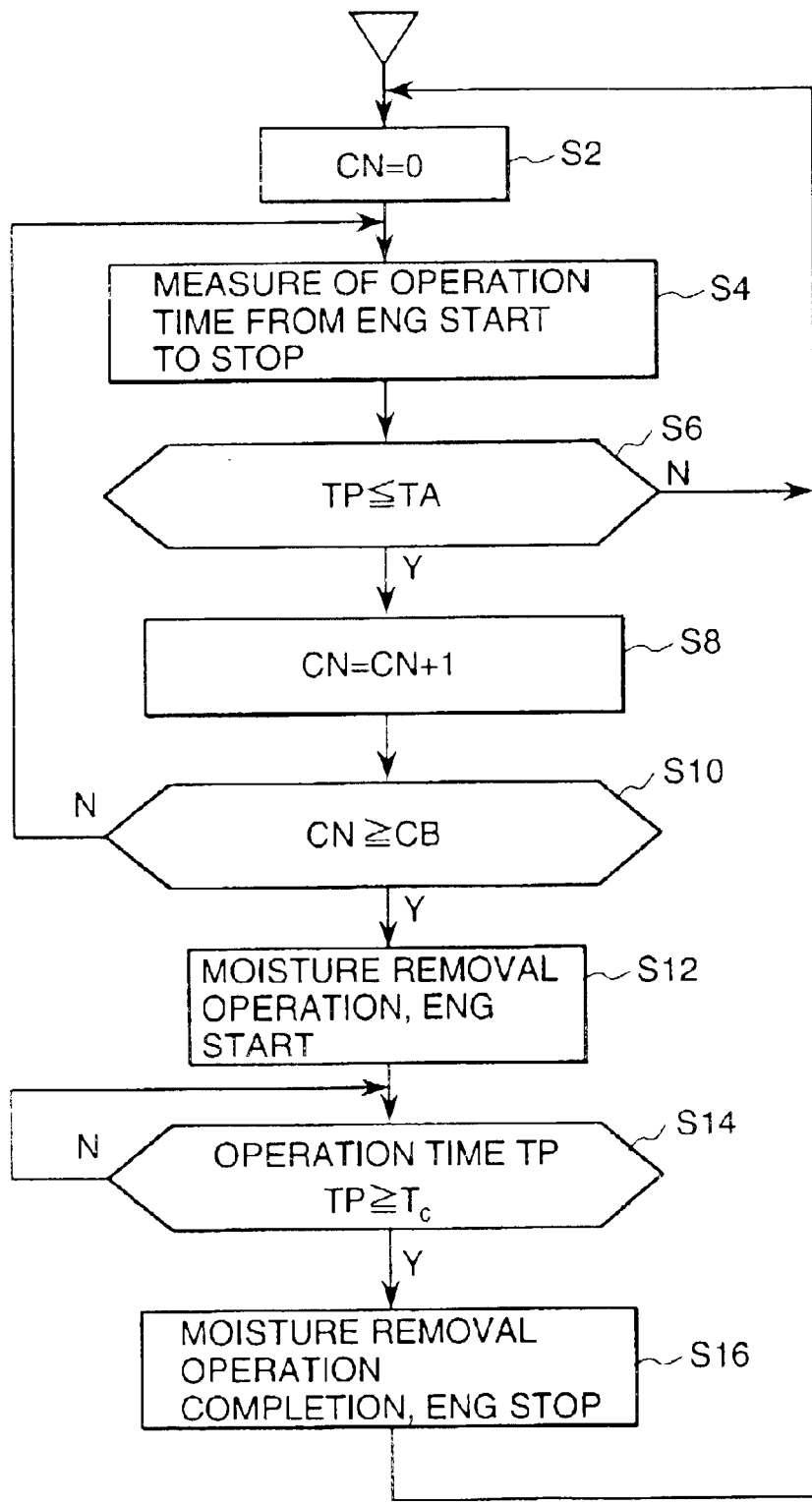
FIG. 2 is a diagram showing a control flow of a one embodiment of the present invention.

A control flow showing an embodiment of the present invention is shown in FIG. 2. After starting the internal combustion engine, the engine is stopped in a predetermined time, and when the number of times of these start-stoppages exceeds a predetermined continued number of times, it is presumed that the catalyst has trapped an excessive moisture. Then, in order to remove the excessively trapped moisture by the catalyst, no lead operation of the internal combustion engine is performed for a predetermined time to evaporate the moisture therefrom. In FIG. 2, by counting the number of start-stoppages of the internal combustion engine the amount of moisture in the catalyst is estimated.

An operation control flow as shown in FIG. 2 will be explained. At step S2 a counter CN is initialized which counts number of engine (hereinbelow ENG) operation times below a predetermined time interval. Namely the counter is rendered CN=0. At step S4 ENG operation time interval TP from the ENG start to stoppage is measured. Then, at step S6 it is judged whether the measured operation time interval TP is shorter than a predetermined time interval TA. When TP<TA, counter value is incremented to CN=(CN+1) at step S8 by counting the ENG operation times. At step S10 it is judged whether the counter value CN is larger than a predetermined number CB, and if the counter number CN does not reach CB, the process returns to step S4 and again measures the ENG operation time interval and counts the number by the counter.

Now, at step S6 when TP>TA, namely No at step S6, process returns to step S2 to render the counter CN=0, namely to render the accumulated value 0 and again begins the accumulation count. In the present embodiment when the number of operation times of TP<TA is below the predetermined number of times CB, and an ENG operation of TP>TA is performed, the accumulation value is initialized and the number of operation times is again recounted. The value of TA is empirically determined to meet the catalyst used.

Further, when the judgement result on CN≧CB with regard to the counted value CN at step S10 is Yes, the ENG is started in order to perform the moisture removing operation. The operation is continued until the operation time TP reaches a predetermined time Tc which is necessitated for fully evaporating the moisture in the catalyst. When the operation time TP for removing the moisture satisfies the condition TP≧Tc at step S14, the operation for the moisture removal is ended at step S16. Thereafter, the process returns to step S2 to render CN=0, and again begins to count continued number of operation times in which the ENG operation time interval is shorter than the predetermined time TA.

Further, in FIG. 2 embodiment, the operation time from the ENG start to stoppage is measured at step S4, however, a combination with the ENG stoppage time can be conceived. Namely, time interval from the ENG stoppage to start is measured and if the ENG stoppage continues over a predetermined time interval, the counter value can be rendered CN=0. Alternatively, the counter value CN can be counted down, when such ENG stoppage continued. With the above method, the counter value CN is corrected by the ENG stoppage time interval which realizes a proper moisture removal operation in view of the ENG stoppage time interval other than the ENG operation time interval.

Figure 3:
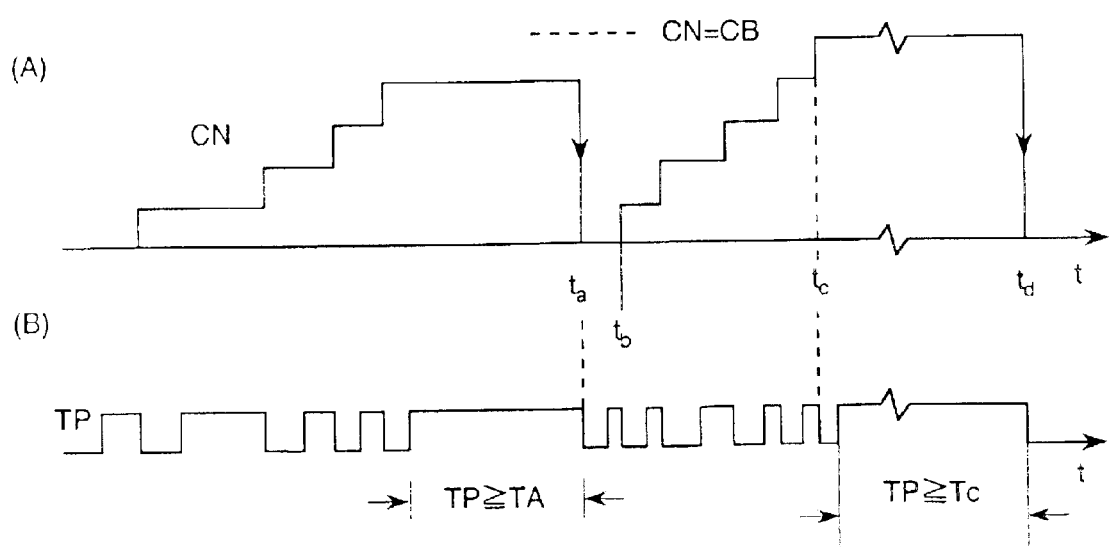
FIG. 3 is a diagram showing an operation of a counter for explaining the present invention.

FIG. 2 control flow will be further explained with reference to a time chart as shown in FIG. 3. (A) in FIG. 3 illustrates a counting operation of the counter and (B) in FIG. 3 illustrates the ENG operation time interval TP. The counter counts the number of ENG operation time below TA. For example, when an operation time TP larger than TA appears at time ta, the judgement at S6 gives No. Accordingly, the counter value CN is reset at step S2. Then the counting is restarted at time tb and the count value reaches CN=CB at time tc, in that at step S10 in FIG. 2, the moisture removing operation from the catalyst is forcedly started (S12). When such operation is continued for Tc, the moisture removing operation is ended at time td. The counter value CN is reset and start to count number of times in which operation time TP is shorter than the predetermined time TA.

Figure 4:
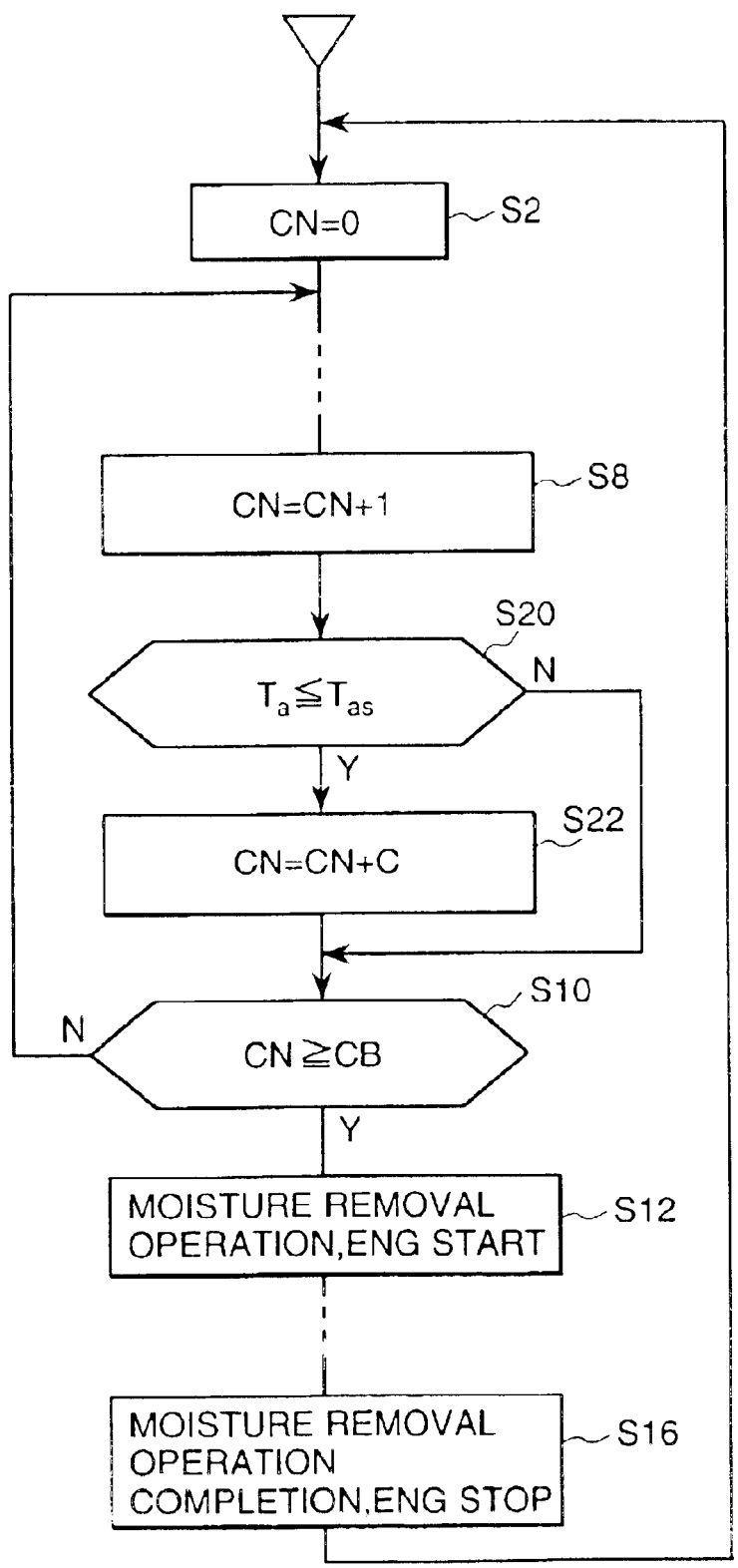
FIG. 4 is a diagram for explaining a control flow of another embodiment according to the present invention.

FIG. 4 shows a modification control flow of FIG. 2 embodiment, in which an ambient temperature is further taken into account. Differences from FIG. 2 embodiment are inclusion of steps S20 and S22. The other steps are the same as those in FIG. 2. At step S20 it is judged whether the ambient temperature Ta is lower than a predetermined ambient temperature Tas and if Ta≦Tas, C is added to the counter value CN at the following step S22. Namely, since when the ambient temperature Ta is lower than the predetermined ambient temperature Tas, C is added, therefore, the number of times which reaches the predetermined number of times CB is speeded up in comparison with FIG. 2 embodiment. For example, when assuming that the predetermined number of times CB is 10 and C=1, if the number of short actual operation times reaches to 5, the predetermined number of times of 10 is satisfied. This is because when the ambient temperature is low, the amount of moisture deposited on the catalyst increased, such is corrected by the above measure.

In the above modification, C is added to the counter value, however, it is possible to vary the predetermined number of times CB itself depending on the ambient temperature.

Figures 5, 6:
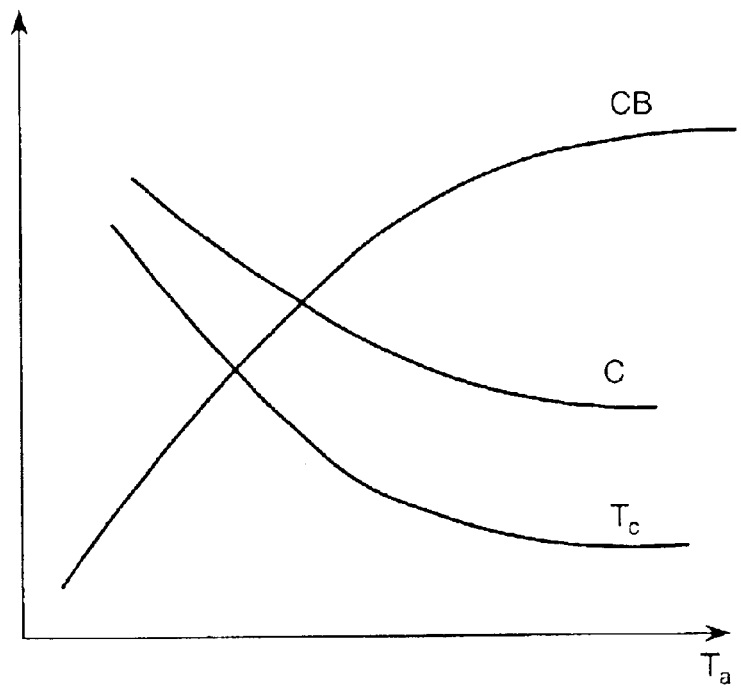
FIG. 5 is a diagram for explaining correction of a constant according to the present invention.
FIG. 6 is a table for explaining correction of a constant according to the present invention.

Qualitative relationships between CB, C and Tc with regard to ambient temperature Ta are shown in FIG. 5. Such as the counter value CN or the moisture removing operation time can be respectively modified and determined depending on these characteristics. When these characteristics are grasped in relation to the characteristic of the catalyst used, an optimum moisture removing operation can be performed by making use of these characteristics. An example of set tables on these parameters is shown in FIG. 6 and a relationship of magnitude of these parameters is shown as a marginal note in FIG. 6.

Figure 7:
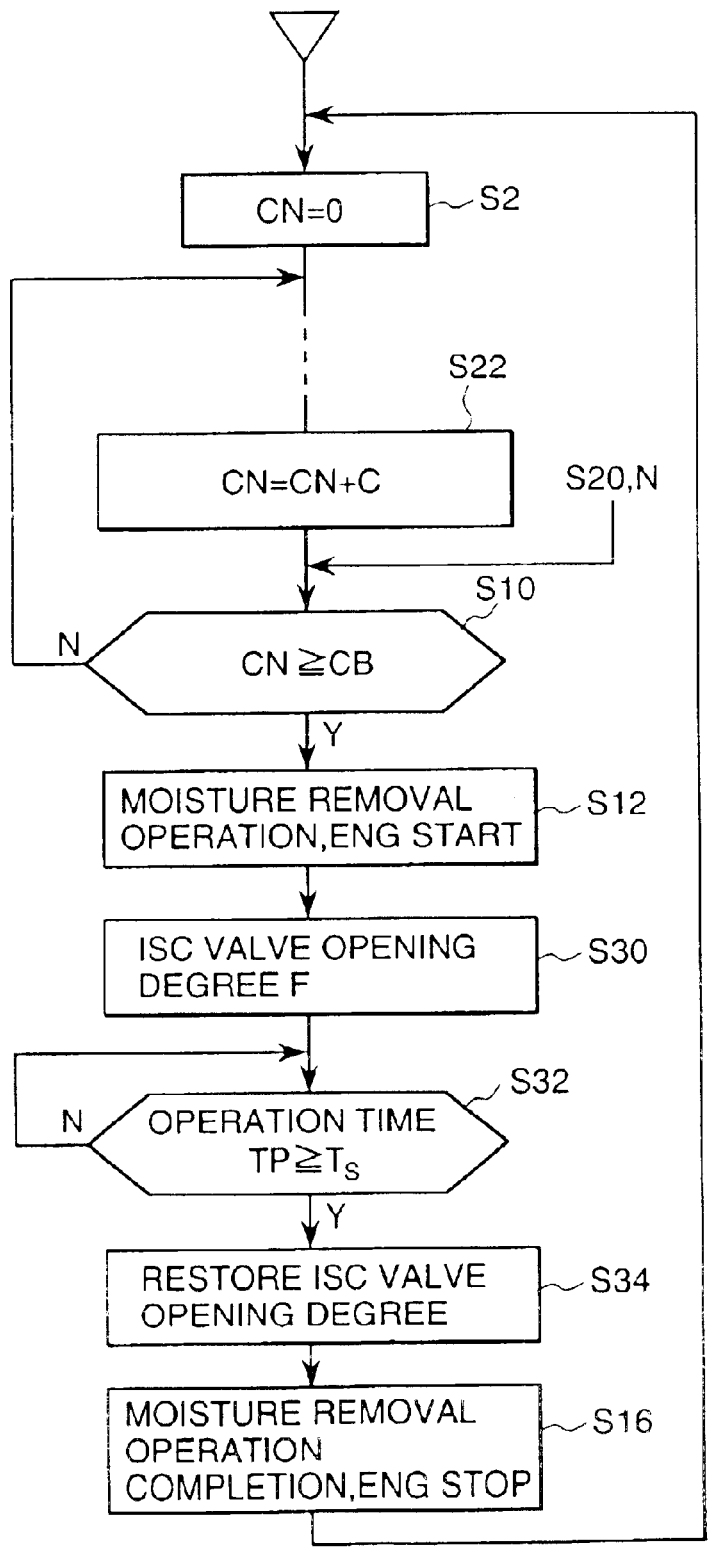
FIG. 7 is a diagram for explaining a control flow of still another embodiment according to the present invention.

FIG. 7 shows another control flow of moisture removing operation in which an idling engine speed is increased in order to shorten time required for removing the moisture. Other than steps S30, S32 and S34, the steps in FIG. 7 embodiment are equivalent to those of FIG. 2 or FIG. 4. At step S30 the opening degree of an ISC valve is set at F which is larger than a usual valve opening degree and satisfies a rapid moisture removing operation for the catalyst. At step S32 the above operation is continued until the operation time TP thereof reaches the predetermined operation time Ts. When the condition in step S32 is satisfied, the opening degree of the ISC valve is restored at step S34 to end the rapid moisture removing operation. In accordance with the increased idling engine speed, the time required for moisture removal is shortened. When comparing the set value Ts for the moisture removal operation time with Tc in FIG. 2, the following relationship stands Ts<Tc.

Now, examples of tests performed according to the above operations will be explained with reference to FIGS. 8 and 9.

Example of test 1-1-1 will be explained. The example shows a test result performed according to FIG. 2 embodiment wherein it is assumed that the ENG short time operation time is 90 sec., the continued accumulation time value by the counter CN is 10 times and the moisture removing operation time is 10 minutes and a motor vehicle having a lean burn gasoline engine of cubic capacity 1.5L was used. A lean NOx catalyst 2 was used for the catalyst and the test was performed by placing the motor vehicle in a constant temperature room of $5_iC$, under which condition an idling operation after ENG start was performed for 1 minute and the ENG was stopped. Such operation was repeated 25 times. Thereafter, the weight of the catalyst attached to the exhaust pipe was measured. From the difference of catalyst weight before attaching the catalyst to the pipe and after the test, the weight increase (amount of moisture) of the catalyst was determined. FIG. 8 shows the increased catalyst weight (amount of moisture) in this test which indicates that the moisture in the catalyst has increased through the above operation.

Figure 9:
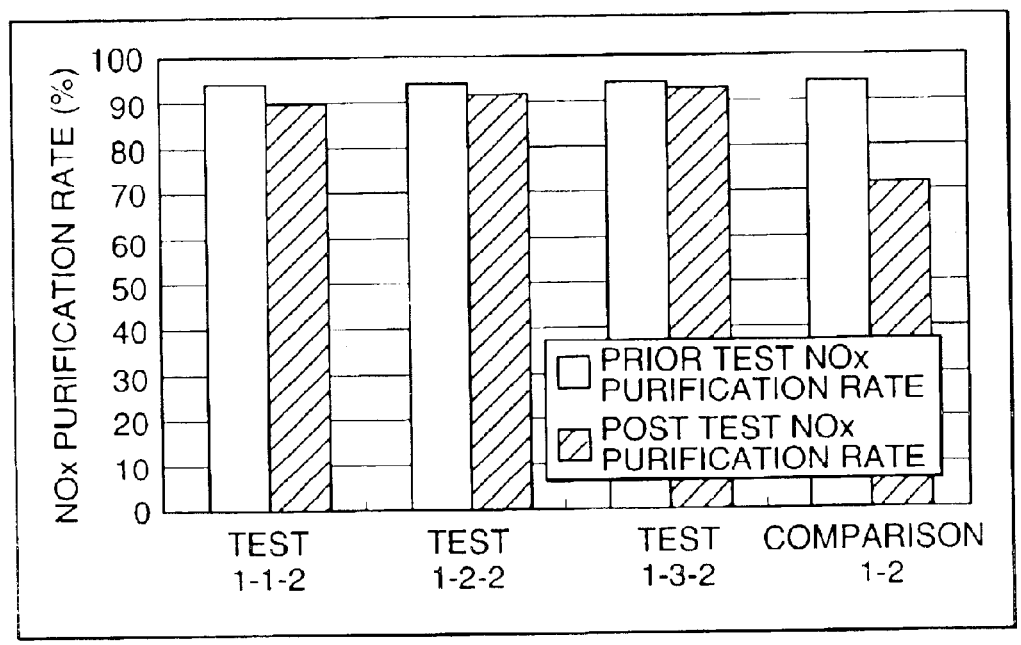
FIG. 9 is a diagram for explaining another advantage of the embodiments according to the present invention.

In example of test 1-1-2 the above example of test 1-1-1 was repeated 10 times, in that the operation of idling of 1 minute and ENG stop was repeated 25×10 times, so as to cause to trap moisture in the lean NOx catalyst. Thereafter, a cruising in 10–15 mode (the operation mode determined by Ministry of Land, Infrastructure and Transport of Japan) is performed and NOx concentrations NOx1 and NOx2 at inlet and outlet portions of the lean NOx catalyst in this instance were measured. Then the following NOx purification rate was calculated;

NOx purification rate=(1-(NOx2/NOx1)) and the result thereof is illustrated as the example of test 1-1-2 in FIG. 9 from which it is observed that NOx purification rate is reduced.

Now, test example 1-2-1 in FIG. 8 will be explained. The test example was performed according to FIG. 4 control flow where the control unit was programmed while assuming that the set ambient temperature value is Tas=$10_iC$ and the counter correction value C=(+2) and the other set values were set as same as those in test example 1-1-1, and was mounted on the above motor vehicle having the lean burn gasoline engine of cubic capacity 1.5L. Further, a lean NOx catalyst 2 was used for the catalyst and the test was performed by placing the motor vehicle in a constant temperature room of 5°.

With the above motor vehicle, the operation of idling-stop was repeated in the same sequence as in the test example 1-1-1. The catalyst weight change was measured in the same sequence as in test example 1-1-1 and the obtained result is shown as test example 1-2-1 in FIG. 8. Although the moisture increase is less than that in the test example 1-1-1, however, it is observed that the moisture in the catalyst still increases. In the present test since it is assumed C=2, the predetermined number of times CB is reached with ⅓ number of times in comparison with that in the test example 1-1-1.

Further, test example 1-2-2 as shown in FIG. 9 was performed under the following conditions. In that, through repeating the above example test 1-2-1 10 times, the lean NOx catalyst was caused to trap moisture. Then, the NOx purifying performance of the lean NOx catalyst was evaluated in the same sequence as in the example test 1-1-2. The obtained result is shown as example test 1-2-2 in FIG. 9.

Figure 8:
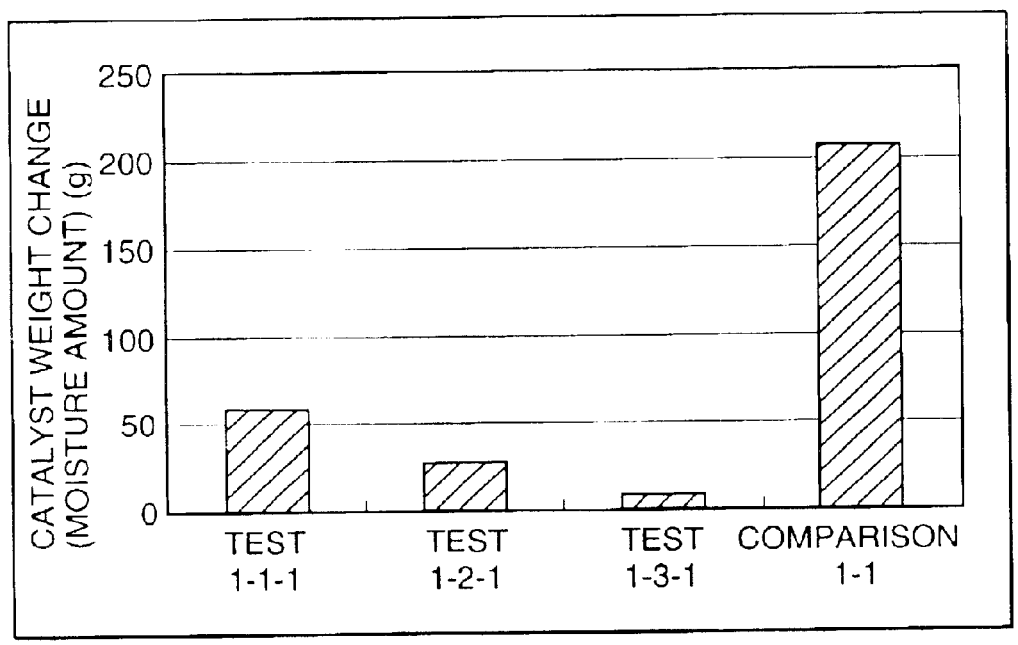
FIG. 8 is a diagram for explaining an advantage of the embodiments according t o the present invention.

Further, the example test 1-3-1 as shown in FIG. 8 was performed according to FIG. 7 control flow wherein the control unit was programmed while increasing the engine speed during no load operation for performing moisture removal to 1.2 times with respect to the usual engine speed and the other set values were set as same as those in test example 1-2-1, and was mounted on the above motor vehicle having the lean burn gasoline engine of cubic capacity 1.5L. Further, a lean NOx catalyst 2 was used for the catalyst and the test was performed by placing the motor vehicle in a constant temperature room of 5°.

With the above motor vehicle, the operation of idling-stop was repeated in the same sequence as in the test example 1-1-1. The catalyst weight change was measured in the same sequence as in test example 1-1-1 and the obtained result is shown as example test 1-3-1 in FIG. 8.

Namely, since the result is a comparison after the moisture removal operation, an effect of moisture removal operation is observed.

Further, test example 1-3-2 as shown in FIG. 9 was performed through repeating the above example test 1-3-1 10 times to cause the lean NOx catalyst to trap moisture. Then, the NOx purifying performance of the lean NOx catalyst was evaluated in the same sequence as in the example test 1-1-2. The obtained result is shown as example test 1-3-2 in FIG. 9. In this example test also an effect of the moisture removal operation is appreciated and it is observed that the NOx purifying rate drop is reduced.

Now an example comparison 1-1 will be explained. A usual control unit was mounted on the motor vehicle having the lean burn gasoline engine of cubic capacity 1.5L as used in the above embodiment. In the exhaust pipe of the above motor vehicle the lean NOx catalyst 2 comparable to that for the example test 1-1-1 was mounted and the motor vehicle was arranged in a constant temperature room of 5°. With the above vehicle, the operation of idling-stop was repeated in the same sequence as in the test example 1-1-1. The catalyst weight change was measured in the same sequence as in test example 1-1-1 and the obtained result is shown as example comparison 1-1 in FIG. 8. The result is used as a comparison when no catalyst trapped moisture removal operation is performed. By making use of the comparison the effect of the moisture removal operation of the above embodiments is clarified.

Now, example comparison 1-2 will be explained, which was performed by repeating the above example comparison 1-1 10 times to cause the lean NOx catalyst to trap moisture. Thereafter, the NOx purifying rate of the lean NOx catalyst was determined with the same sequence as that in example test 1-1-2. The obtained result is shown as example comparison 1-2 in FIG. 9. Both example comparisons 1-1 and 1-2 are comparison data when no moisture removal operations were performed. In contrast, the other three example tests 1-1-1, 1-2-1 and 1-3-1 are ones when the moisture removal operations were effected in which the amount of trapped moisture is improved which shows an apparent advantage of the present invention.

Likely, with regard to NOx purifying rate as shown in FIG. 9, in comparison with the example comparison 1-2 in which no moisture removal operation was performed, the other three example tests 1-1-2, 1-2-2 and 1-3-2 in which the moisture removal operations were performed show an improvement in NOx purifying rate which shows an apparent advantage of the present invention.

The graph in FIG. 8 shows that in connection with weight increase of the lean NOx catalyst through repetition of ENG idling-stop the weight increase according to the present invention was limited. Further, among the embodiments, since the example test 1-3-1 shows the minimum weight increase, it is clarified that by adding the ambient temperature as one of judgement terms and by increasing the exhaust gas temperature during the moisture removal operation, the moisture removal in the catalyst is further effectively performed. Accordingly, it is clarified that with the above embodiments an advantage of reducing the moisture amount in the lean NOx catalyst is achieved in comparison with the example comparison.

Further, according to the above result, a highly reliable catalyst system can be built by noting the accumulated number of times of short operations and by estimating the amount of moisture trapped by the catalyst without necessitating a special measurement mechanism. Accordingly, the present invention is characterized in that the same can be realized with a simple method and can be easily applied to a variety type of motor vehicles.

FIG. 9 graph shows that even in connection with the NOx purification rate during 10–15 mode cruising the present embodiments suppress reduction of the catalyst performance. Further, among the example tests 1-1-2, 1-2-2 and 1-3-2, the example test 1-3-2 shows the best catalyst purifying performance which permits to maintain a high catalyst activity by the effective moisture removal. Accordingly, it is clarified that the lean NOx catalyst assembled in the example test can maintain an excellent purifying performance by the moisture removal operation according to the present invention. Therefore, with the present invention, the reduction of the catalyst purifying performance due to the trapped moisture is prevented and a high catalyst purifying performance can be maintained.

Figure 10:
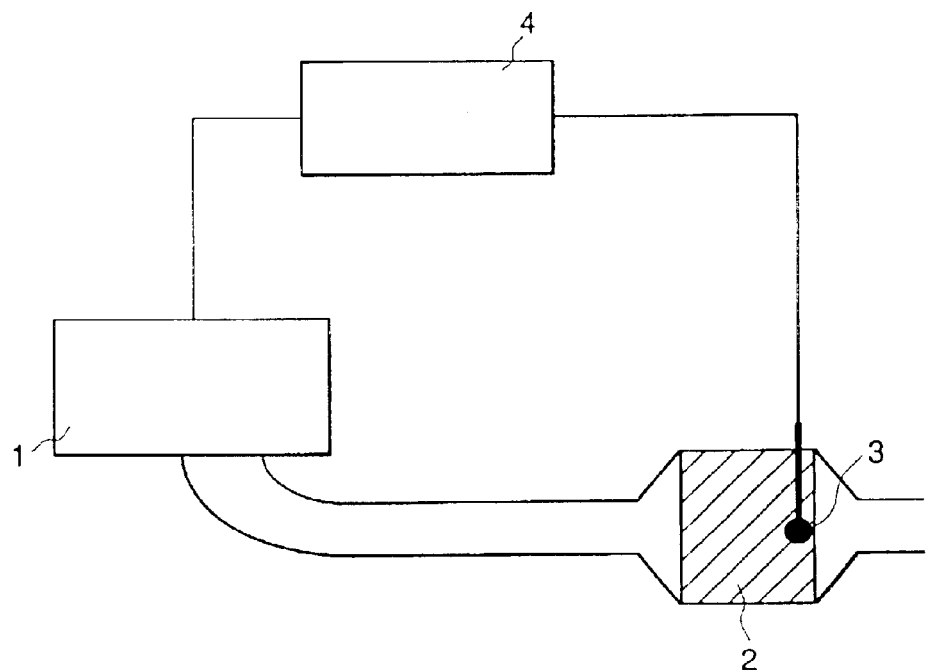
FIG. 10 is a constitutional diagram of an exhaust gas purifying device representing a further embodiment of the present invention.
Figure 11:
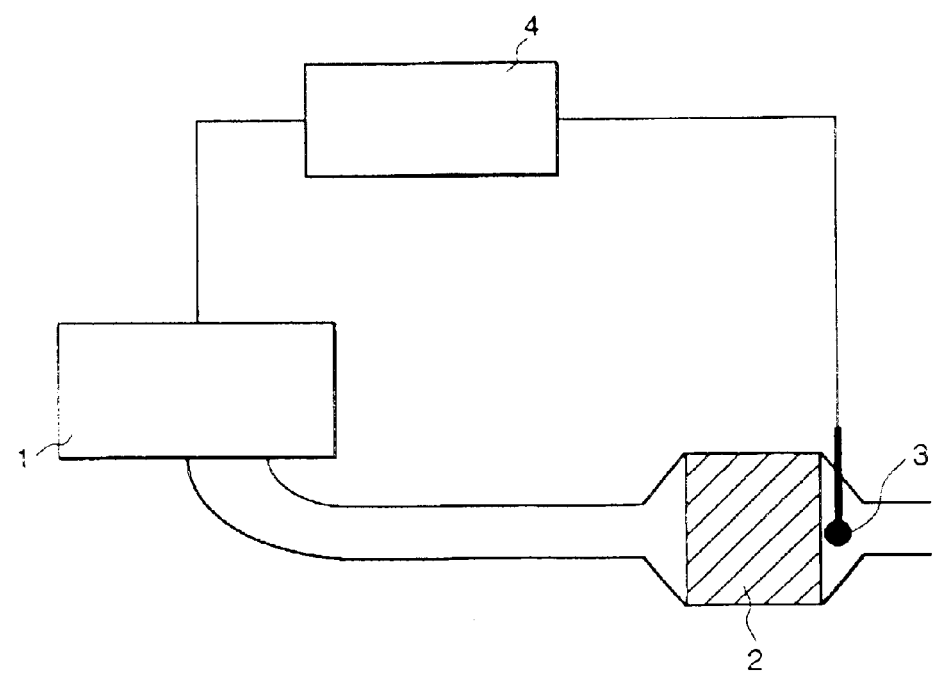
FIG. 11 is a constitutional diagram of an exhaust gas purifying device representing a further embodiment of the present invention.

Exhaust gas purifying devices representing embodiments 2 according to the present invention are shown in FIGS. 10 and 11.

In these embodiments, other than the operation time as in the embodiments 1, the catalyst temperature and the exhaust gas temperature at the exhaust gas downstream portion of the catalyst are made use of as the trapped moisture amount estimation means.

In FIG. 10 embodiment, a lean NOx catalyst 2 is disposed at the downstream side of an engine 1 and a temperature measurement device 3 is disposed in the lean NOx catalyst 2 at a position of 10 mm upstream side from the end of the downstream side thereof. Further, the engine 1 and the temperature measurement device 3 are coupled with a control unit 4 so as to permit an engine operation control.

In contrast to FIG. 10, in FIG. 11 embodiment the temperature measurement device 3 is disposed in the center portion of an exhaust pipe at a position 10 mm downstream side from the end of the downstream side of the lean NOx catalyst 2. Except for the above, the same as in FIG. 10 is applied to FIG. 11 embodiment.

Figure 12:
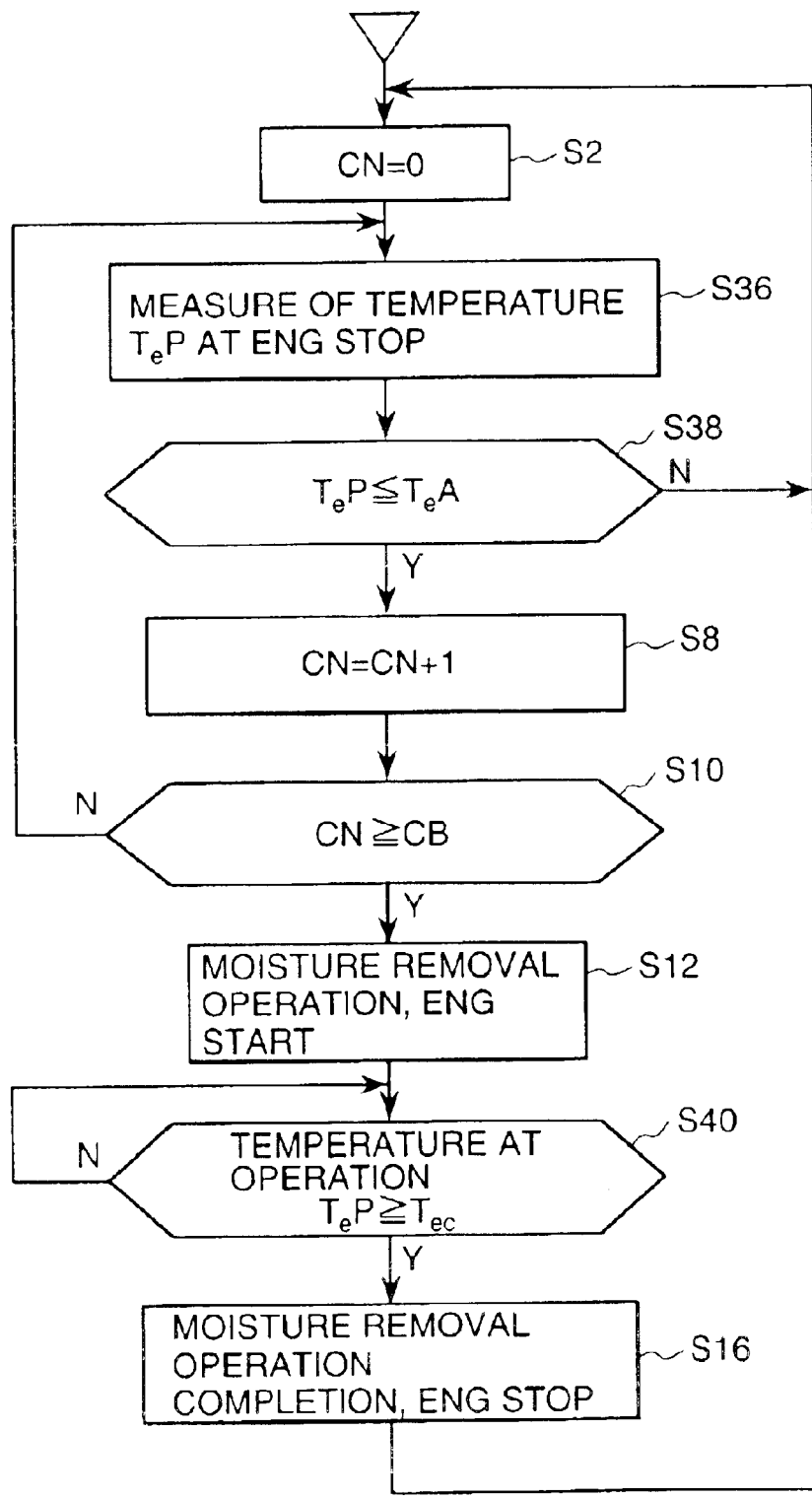
FIG. 12 is a diagram for explaining a control flow of a further embodiment according to the present invention.

A control flow for the embodiments 2 is shown in FIG. 12. In contrast to FIG. 2 control flow, the trapped moisture amount estimation means is modified from the use of the engine operation time to the use of catalyst temperature and of the exhaust gas temperature in the exhaust gas downstream portion of the catalyst.

Instead of step S4, step S36 is introduced in which temperature TeP of the catalyst or the exhaust gas at the time of ENG stoppage is measured and instead of step S6, step S38 is introduced in which it is judged whether the temperature TeP at the time of ENG stoppage is lower than a predetermined temperature TeA. Further, instead of step S14, step S40 is introduced in which it is judged whether the temperature TeP of the catalyst or the exhaust gas at the time of moisture removal operation is lower than a predetermined temperature Tec. The other steps in FIG. 12 are the same as those in FIG. 2.

Further, the temperatures TeA and TeP can be determined freely, but is usually set at temperatures in a rage of 70–150°.

Figure 13:
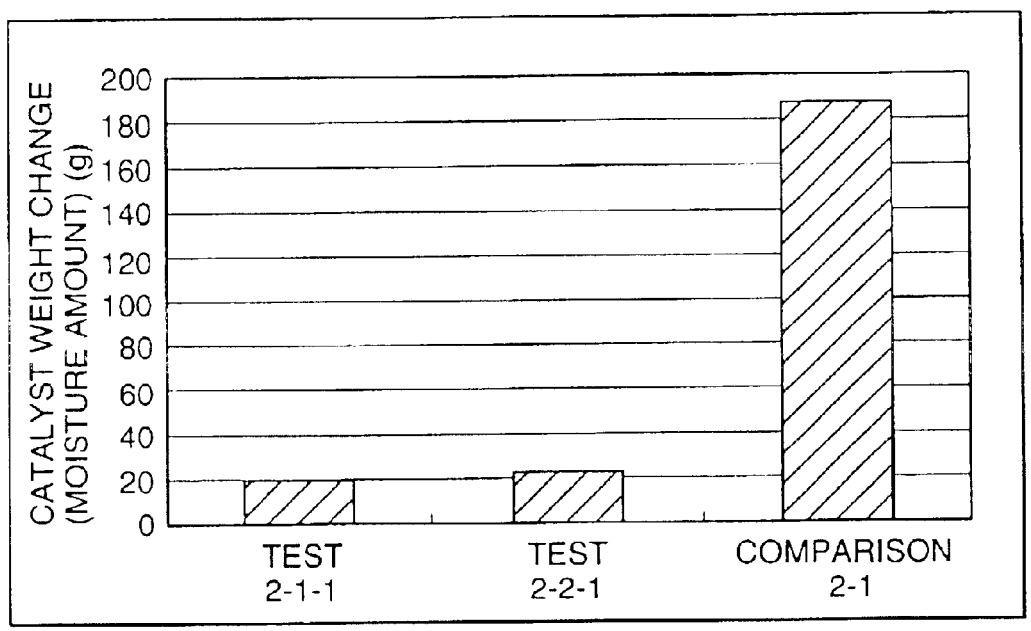
FIG. 13 is a diagram for explaining an advantage of the further embodiments according to the present invention.

Example test 2-1-1 in FIG. 13 will be explained. While employing FIG. 10 structure, the control unit which is programmed by setting both the temperature after stopping a short time operation and the temperature after completing the moisture removal operation at 110° and by further setting the other parameters at the same values as in the example test 1-1-1, was mounted on the above motor vehicle having the lean burn gasoline engine of cubic capacity 1.5L. Further, the test was performed by placing the motor vehicle in a laboratory room of 25°.

With the above motor vehicle, the operation of idling-stop was repeated in the same sequence as in the test example 1-1-1. Thereafter, the catalyst weight change was measured in the same sequence as in test example 1-1-1.

Example test 2-2-1 in FIG. 13 will be explained. With FIG. 11 structure, the same control and test as those in example test 2-1-1 were performed and the catalyst weight change was measured.

Now, example comparison 2-1 will be explained. In contrast to the example comparison 1-1 the example comparison 2-1 was performed by placing the motor vehicle in the laboratory room of temperature 25°. Except for this temperature difference the test was performed with the same constitution and control as in the example comparison 1-1 and the catalyst weight change was measured. The result of these catalyst weight changes are shown in FIG. 13.

The amount of moisture in example tests 2-1-1 and 2-2-1 show less than that in example comparison 2-1, thereby, the effect of the present embodiments is appreciated.

Exhaust gas purifying devices representing embodiments 3 according to the present invention are shown FIG. 14 through 18. In these embodiments, means other than the no load operation as in the embodiments 1 is used for the trapped moisture removal means.

Figure 14:
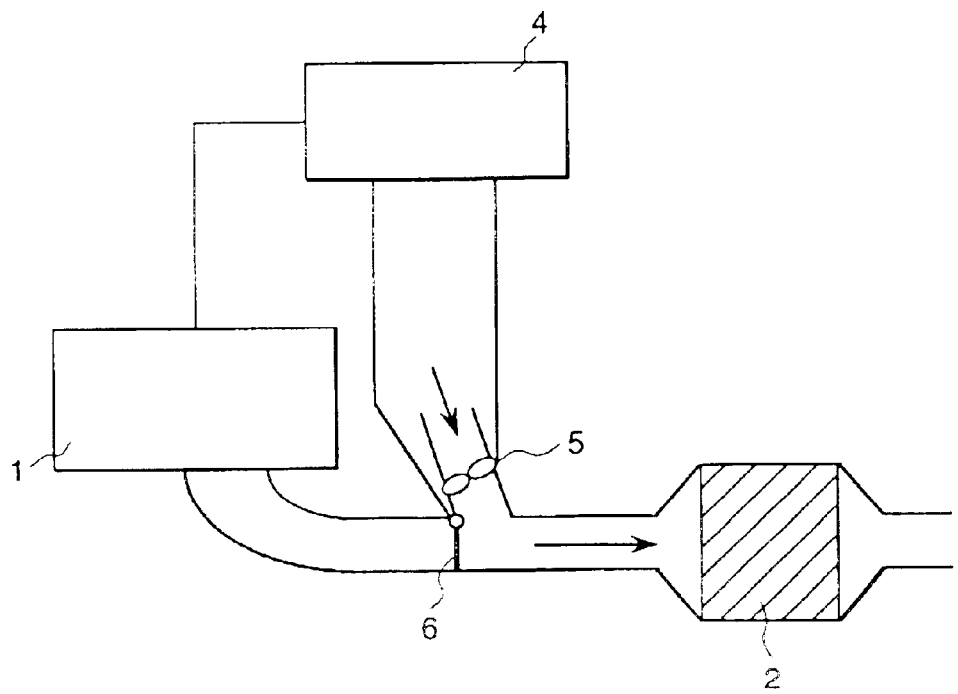
FIG. 14 is a constitutional diagram of an exhaust gas purifying device representing a still further embodiment of the present invention.

In contrast to FIG. 2 embodiment, in FIG. 14 embodiment between the engine 1 and the lean NOx catalyst 2 a hot blast device 5 and a valve 6 are disposed, and through-open and close the valve 6 either the exhaust gas from the engine 1 or the hot air from hot blast device 5 is permitted to be introduced into the catalyst 2. Further, hot blast device 5 and the valve 6 are controllably coupled with the control unit 4. Further, during usual operation, the valve 6 takes the position to introduce the exhaust gas from the engine 1 into the catalyst 2.

Figure 15:
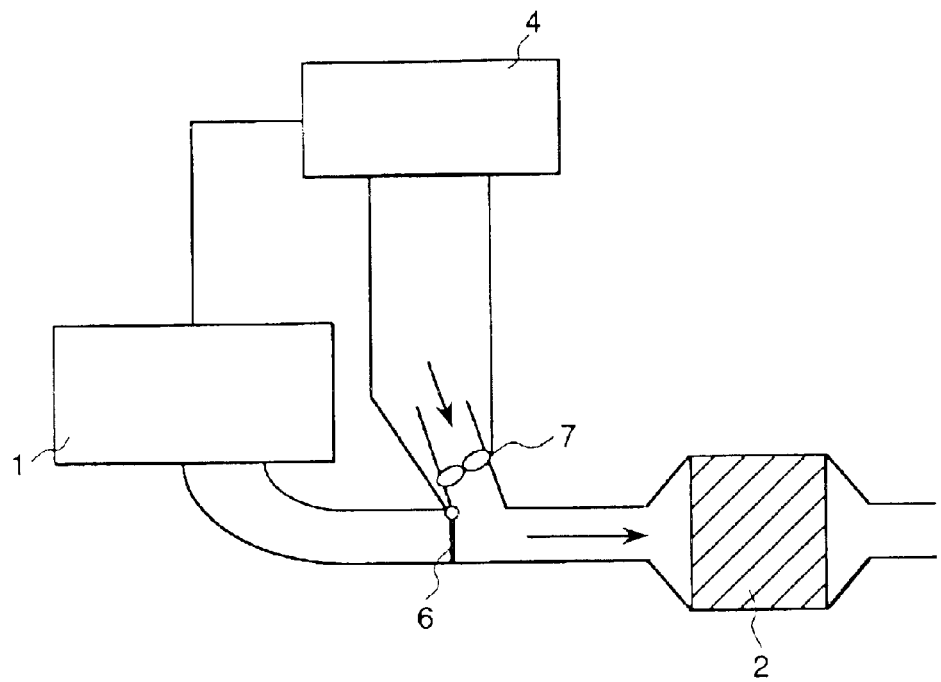
FIG. 15 is a constitutional diagram of an exhaust gas purifying device representing a still further embodiment of the present invention.

In contrast to FIG. 14, in FIG. 15 embodiment in place of the hot blast device 5 a blower device 7 is disposed. Further, the blower device 7 is also controllably coupled with the control unit 4.

Figure 16:
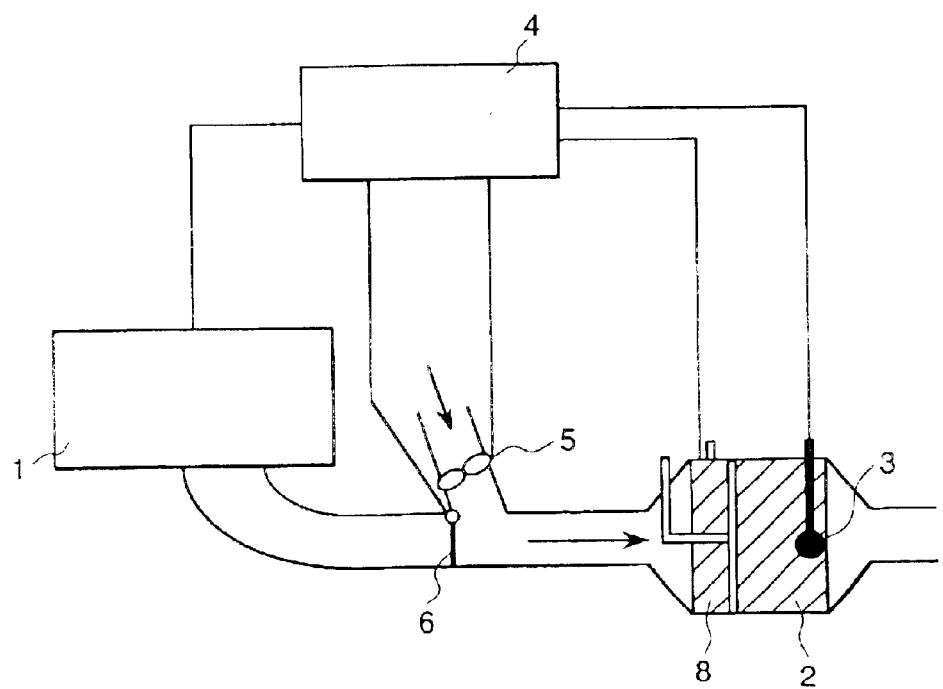
FIG. 16 is a constitutional diagram of an exhaust gas purifying device representing a still further embodiment of the present invention.

In contrast to FIG. 15, in FIG. 16 embodiment an electrically heated catalyst 8 is disposed at the upstream portion of the lean NOx catalyst 2. Further, the electrically heated catalyst 8 is also controllably coupled with the control unit 4.

Figure 17:
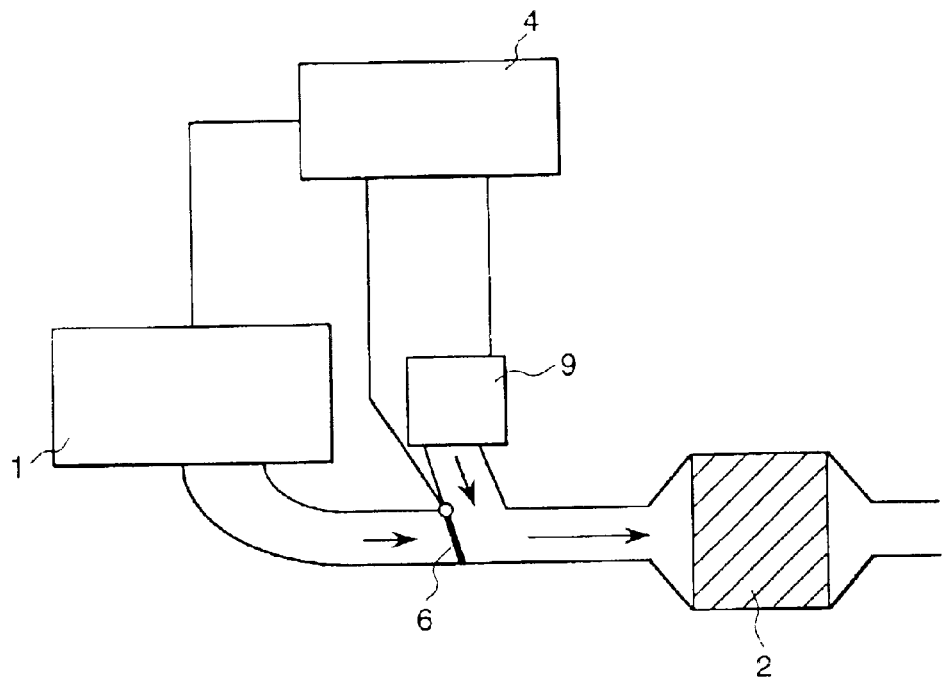
FIG. 17 is a constitutional diagram of an exhaust gas purifying device representing a still further embodiment of the present invention.

In contrast to FIG. 14, in FIG. 17 embodiment a pump 9 is disposed in place of the hot blast device 5. Further, the pump 9 is also controllably coupled with the control unit 4.

Figure 18:
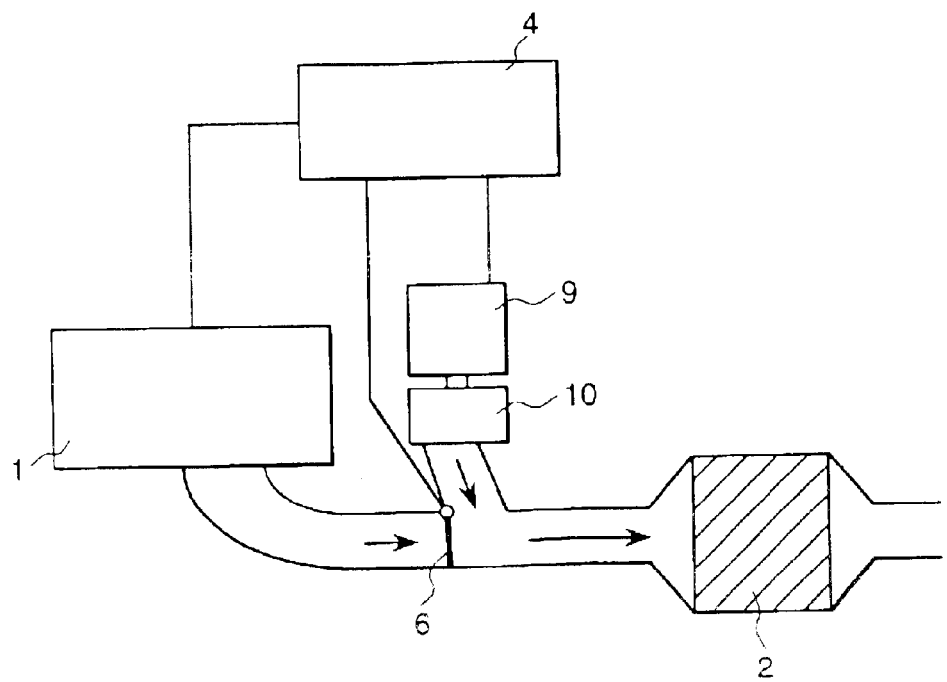
FIG. 18 is a constitutional diagram of an exhaust gas purifying device representing a still further embodiment of the present invention.

In contrast to FIG. 17, in FIG. 18 embodiment a pressure vessel 10 is disposed between the pump 9 and the valve 6. Further, the pressure vessel 10 is also coupled with the control unit 4 so as to permit open and close control thereof.

Figure 19:
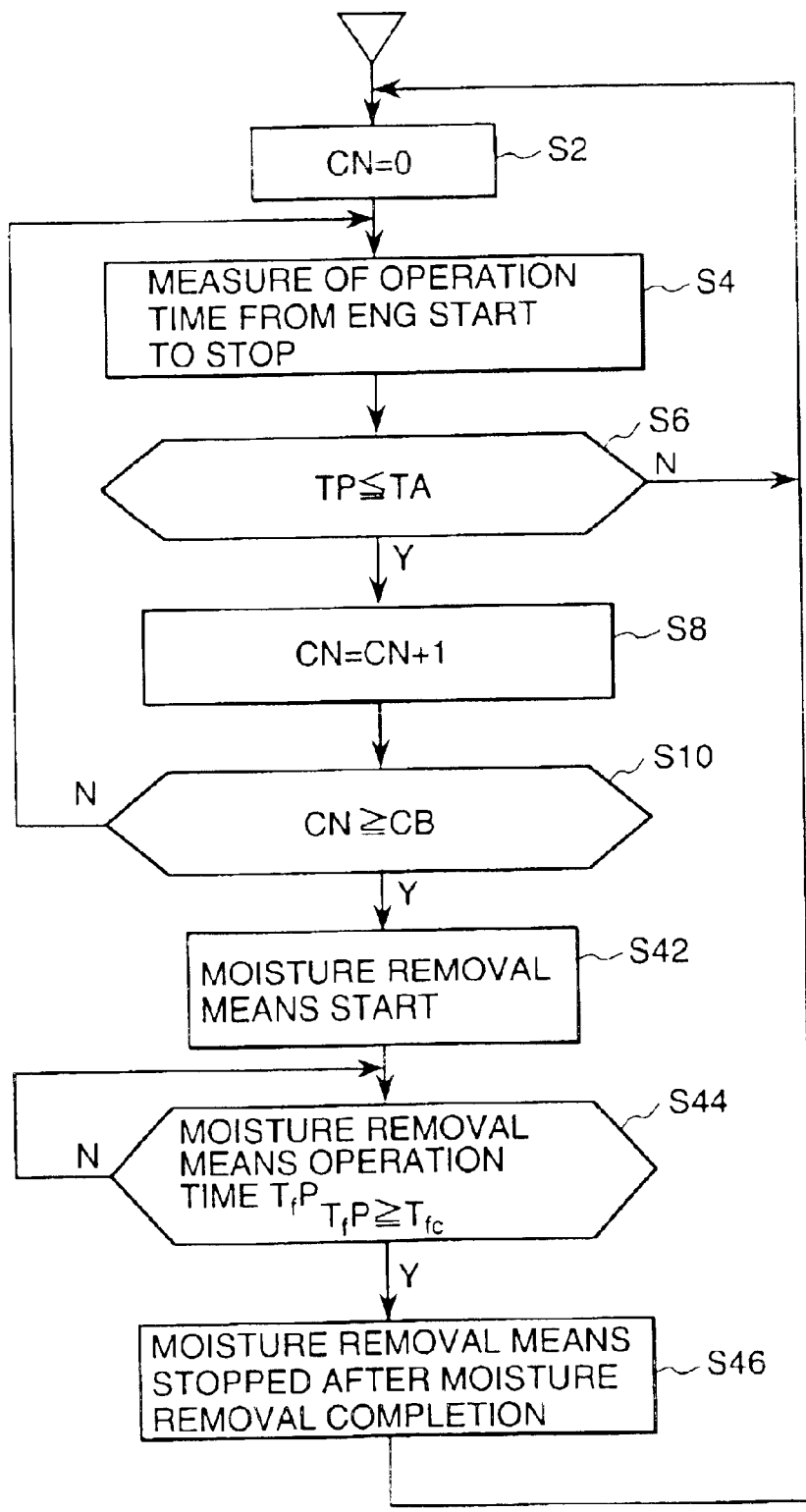
FIG. 19 is a diagram for explaining a control flow of a still further embodiment according to the present invention.

A control flow for the embodiments 3 is shown in FIG. 19. In contrast to FIG. 2 control flow, the trapped moisture removal means is effected with the above respective moisture removal means other than through the no load operation and it is judged that the moisture removal is completed in the operation time of the respective means.

In FIG. 19 control flow, instead of step S12, step S42 is introduced in which the moisture removal means is started, and instead of step S14, step S44 is introduced in which it is judged whether the operation time TfP of the moisture removal means is shorter than a predetermined time Tfc. Further, instead of step S16, step S46 is introduced in which the operation of the moisture removal means is ended after completion of the moisture removal. Other steps in FIG. 19 control flow are the same as those in FIG. 2.

Further, although the setting temperature of the heating means for the moisture removal means is preferable to be more than a moisture removal temperature region, however, moisture can be removed, if the set temperature thereof is below the moisture removal temperature region. With regard to the means having a setting temperature of more than the moisture removal temperature region the moisture removal completion can be judged according to the catalyst temperature and the exhaust gas temperature in the exhaust gas downstream portion of the catalyst.

Example test 3-1-1 will be explained. With the FIG. 14 embodiment the test was performed according to FIG. 19 control flow. At step S42 the moisture removal means opens the valve 6 so as to close the engine side and causes the hot blast device 5 having output of 10 KW to blow heated wind through the catalyst with the wind velocity of 1 m/s. In this instance, the operation time of the moisture removal means is set at 10 minutes. After completing moisture removal, the hot blast device 5 is deactivated and the valve 6 is closed. The other setting parameters are set at the same setting values as in example test 1-1-1. The control unit programmed according to the above was mounted on the previously referred to motor vehicle having a lean burn gasoline engine of cubic capacity 1.5L. The test was performed by placing the motor vehicle in the laboratory room at temperature 25°.

With the above motor vehicle, the operation of idling-stop was repeated in the same sequence as in the test example 1-1-1. Thereafter, the catalyst weight change was measured in the same sequence as in test example 1-1-1.

Example test 3-2-1 will be explained. With the FIG. 15 embodiment the test was performed according to FIG. 19 control flow. At step S42 the moisture removal means opens the valve 6 so as to close the engine side and causes the wind blower device 7 to blow wind through the catalyst with the wind velocity of 1 m/s. In this instance, the operation time of the moisture removal means is set at 20 minutes. After completing moisture removal, the wind blower device 7 is deactivated and the valve 6 is closed. The other setting parameters are set at the same setting values as in example test 1-1-1. The control unit programmed according to the above was mounted on the previously referred to motor vehicle having a lean burn gasoline engine of cubic capacity 1.5L. The test was performed by placing the motor vehicle in the laboratory room at temperature 25°.

With the above motor vehicle, the operation of idling-stop was repeated in the same sequence as in the test example 1-1-1. Thereafter, the catalyst weight change was measured in the same sequence as in test example 1-1-1.

Example test 3-3-1 will be explained. With the FIG. 16 embodiment the test was performed according to FIG. 19 control flow. At step S42 the moisture removal means opens the valve 6 so as to close the engine side and causes the wind blower device 7 to blow wind through the catalyst with the wind velocity of 1 m/s, while setting the heater output of the electrically heated catalyst 8 at 10 KW. In this instance, the operation time of the moisture removal means is set at 10 minutes. After completing moisture removal, the wind blower device 7 and the heater of the electrically heated catalyst 8 are deactivated and the valve 6 is closed. The other setting parameters are set at the same setting values as in example test 1-1-1. The control unit programmed according to the above was mounted on the previously referred to motor vehicle having a lean burn gasoline engine of cubic capacity 1.5L. The test was performed by placing the motor vehicle in the laboratory room at temperature 25°.

With the above motor vehicle, the operation of idling-stop was repeated in the same sequence as in the test example 1-1-1. Thereafter, the catalyst weight change was measured in the same sequence as in test example 1-1-1.

Example test 3-4-1 will be explained. With the FIG. 17 embodiment the test was performed according to FIG. 19 control flow. At step S42 the moisture removal means opens the valve 6 so as to close the engine side and causes to operate the pump 9 by the engine power so as to increase the exhaust gas flow velocity through the catalyst by the wind velocity of 0.5 m/s. In this instance, the operation time of the moisture removal means is set at 5 minutes under the engine rotating condition. After completing moisture removal, the pump 9 as well as the engine 1 are deactivated and the valve 6 is closed. The other setting parameters are set at the same setting values as in example test 1-1-1. The control unit programmed according to the above was mounted on the previously referred to motor vehicle having a lean burn gasoline engine of cubic capacity 1.5L. The test was performed by placing the motor vehicle in the laboratory room at temperature 25°.

With the above motor vehicle, the operation of idling-stop was repeated in the same sequence as in the test example 1-1-1. Thereafter, the catalyst weight change was measured in the same sequence as in test example 1-1-1.

Example test 3-5-1 will be explained. With the FIG. 18 embodiment the test was performed according to FIG. 19 control flow. During usual operation of the motor vehicle, air of 0.5 m3 in normal pressure is accumulated in the pressure vessel 10 from the pump 9 by the engine power. At step S42 the moisture removal means opens the valve 6 so as to close the engine side and causes the pressure vessel 10 to blow wind through the catalyst. In this instance, the operation time of the moisture removal means is set at 10 minutes (substantial air accumulated therein is discharged in 10 minutes). After completing moisture removal, the valve 6 is closed. The other setting parameters are set at the same setting values as in example test 1-1-1. The control unit programmed according to the above was mounted on the previously referred to motor vehicle having a lean burn gasoline engine of cubic capacity 1.5L. The test was performed by placing the motor vehicle in the laboratory room at temperature 25°.

With the above motor vehicle, the operation of idling-stop was repeated in the same sequence as in the test example 1-1-1. Thereafter, the catalyst weight change was measured in the same sequence as in test example 1-1-1.

Figure 20:
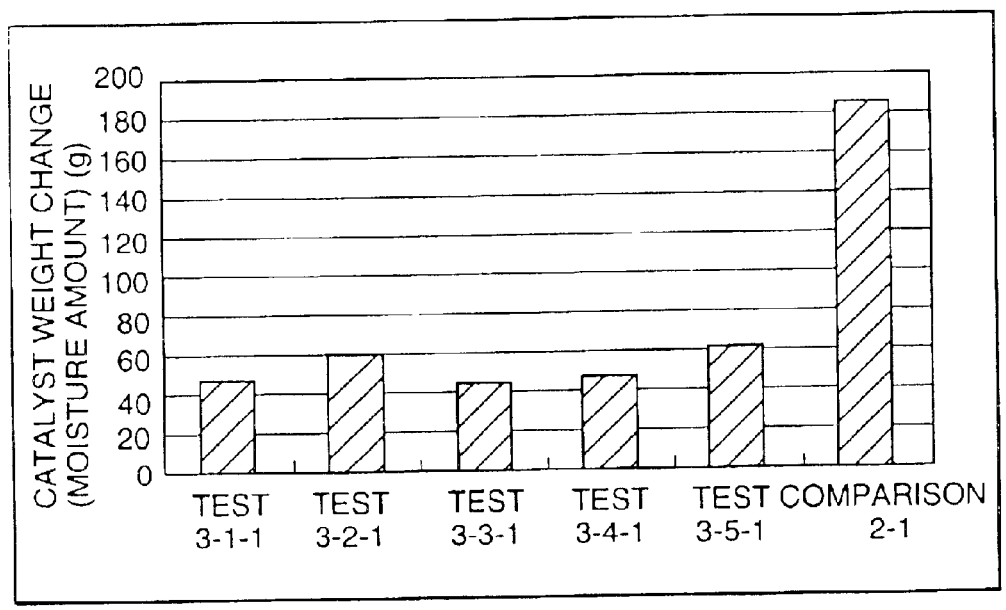
FIG. 20 is a diagram for explaining an advantage of the still further embodiments according to the present invention.

The catalyst weight changes in these example tests are shown in FIG. 20.

The amount of moisture in the above example tests shows less than that in example comparison 2-1, thereby, the effect of the present embodiments is appreciated.

Figure 21:
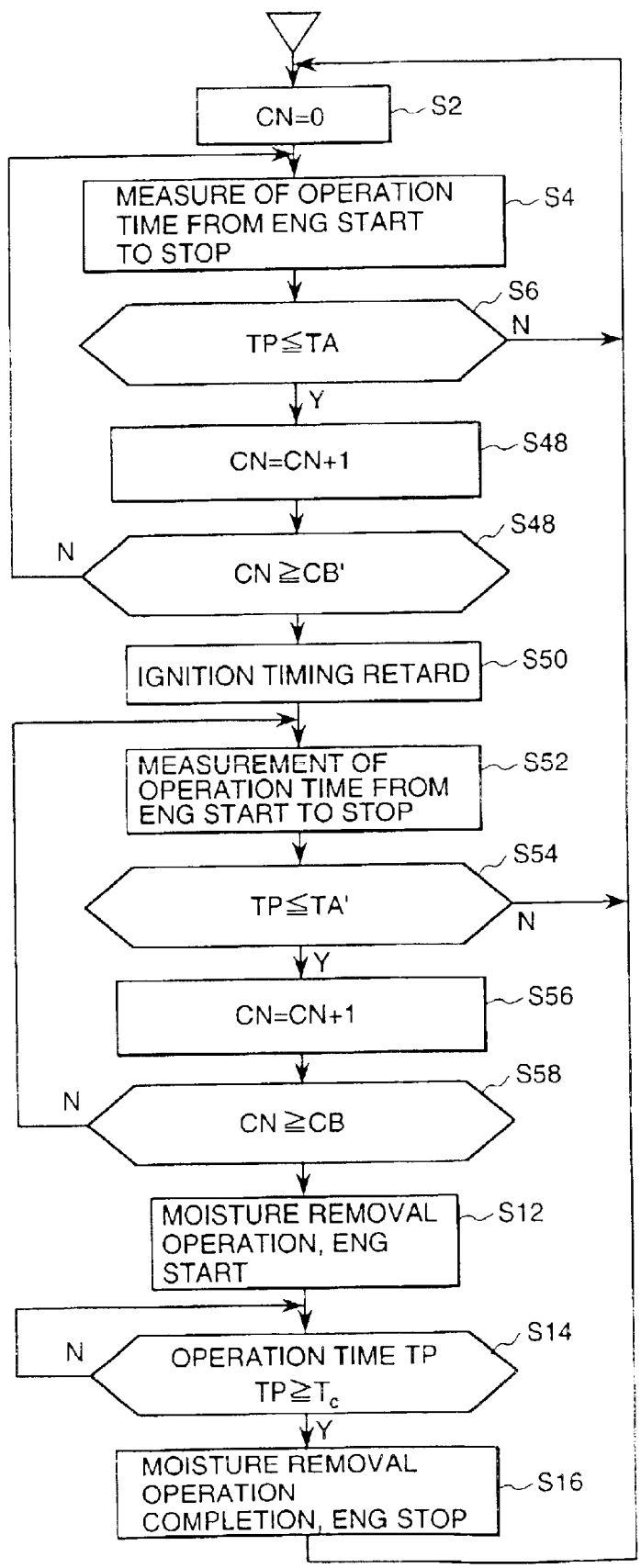
FIG. 21 is a diagram for explaining a control flow of a still further embodiment according to the present invention.

An exhaust gas purifying device representing an embodiment 4 of the present invention is same in its structure as that of the embodiment 1 as shown in FIG. 1. A control flow of the embodiment 4 is shown in FIG. 21. In contrast to FIG. 2 embodiment, in FIG. 21 control flow, after the counter value CN reaches CB' smaller than the predetermined counter value CB at which the activation of the trapped moisture removal means is judged, the engine operation is controlled to retard the ignition timing in comparison with the usual operation to rapidly increase the exhaust gas temperature. In association therewith, the predetermined engine operation time TA is modified to a shorter value TA' and number of times when TP exceeds TA' is counted. When the counter value CN reaches CB, the moisture removal means is activated. The processes thereafter are the same as those in FIG. 2 control flow.

Although in the present embodiment as the means for increasing the exhaust gas temperature the ignition timing retardation is introduced, however, the present invention is never limited thereto. Further, by increasing the exhaust gas temperature, since the amount of moisture generation is decreased, instead of shortening the predetermined time TA the counter value CB can be set larger.

Example test 4-1-1 will be explained. The test was performed according to FIG. 21 control flow, wherein the ENG short operation time TA is set at 90 sec., TA' is set at 80 sec., the continued accumulation value CB of the counter CN is set at 10 times, CB' is set at 4 times and the moisture removal operation time is set at 10 minutes. The control unit programmed according to the above was mounted on the previously referred to motor vehicle having a lean burn gasoline engine of cubic capacity 1.5L. The test was performed by placing the motor vehicle in the laboratory room at temperature 25°.

With the above motor vehicle, the operation of idling-stop was repeated in the same sequence as in the test example 1-1-1. Thereafter, the catalyst weight change was measured in the same sequence as in test example 1-1-1.

Figure 22:
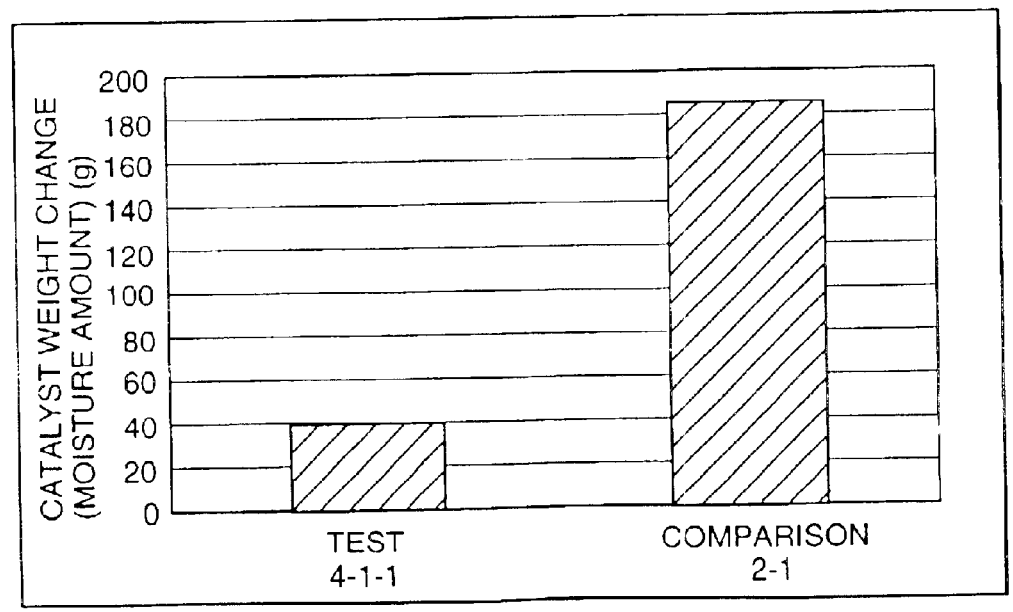
FIG. 22 is a diagram for explaining an advantage of the still further embodiment according to the present invention.

The catalyst weight change in this example test is shown in FIG. 22. The amount of moisture in the above example test shows less than that in example comparison 2-1, thereby, the effect of the present embodiment is appreciated.

As a result of the above, all of the embodiments showed a moisture removal effect with reference to the example comparisons, and since the amount of moisture in the catalyst can be kept below a predetermined amount, catalyst component having high solubility can be used for the NOx catalyst. Further, an exhaust gas purifying device which maintains a further higher purifying performance can be realized.

According to the present invention, since the moisture trapped by the catalyst can be removed and a possible elution of the catalyst components can be prevented, reduction of exhaust gas purifying performance of the catalyst can be prevented.

What is claimed is:

1. A moisture removal control device for an internal combustion engine exhaust gas purifying device comprising: a trapped moisture amount estimation means which estimates amount of moisture exhausted from an internal combustion engine and trapped in a catalyst; a judgment means which judges whether the estimated value of the trapped moisture amount exceeds a predetermined amount; and means for controlling removal of the moisture trapped in the catalyst, wherein the trapped moisture amount estimation means counts number of times of continued operations in which the operation time from activation to stoppage of the internal combustion engine is below a predetermined time and judges whether or not the counted value reaches a predetermined number of times to thereby estimate amount of moisture trapped by the catalyst.

2. A moisture removal control device for an internal combustion engine exhaust gas purifying device according to claim 1, wherein the moisture removal control means raises the exhaust gas temperature during the operation of the internal combustion engine from activation to stoppage thereof higher than that in usual operation thereof before the counted value of the continued operation times reaches a predetermined number of times to shorten the predetermined time interval of the internal combustion engine operation time.

3. A moisture removal control device for an internal combustion engine exhaust gas purifying device which uses a catalyst comprising soluble components, wherein the moisture removal device comprises: a trapped moisture amount estimation means which estimates amount of moisture exhausted from an internal combustion engine and trapped in a catalyst; a judgment means which judges whether the estimated value of the trapped moisture amount exceeds a predetermined amount; and means for controlling removal of the moisture trapped in the catalyst, wherein the trapped moisture amount estimation means counts number of times of continued operations in which the maximum catalyst temperature from activation to stoppage of the internal combustion engine is below a predetermined temperature and judges whether or not the counted value reaches a predetermined number of times to thereby estimate amount of moisture trapped by the catalyst.

4. A moisture removal control device for an internal combustion engine exhaust gas purifying device which uses a catalyst comprising soluble components, wherein the moisture removal device comprises: a trapped moisture amount estimation means which estimates amount of moisture exhausted from an internal combustion engine and trapped in a catalyst; a judgment means which judges whether the estimated value of the trapped moisture amount exceeds a predetermined amount; and means for controlling removal of the moisture trapped in the catalyst, wherein the trapped moisture amount estimation means counts number of times of continued operations in which the maximum exhaust gas temperature at an exhaust gas pipe from activation to stoppage of the internal combustion engine is below a predetermined temperature and judges whether or not the counted value reaches a predetermined number of times to thereby estimate amount of moisture trapped by the catalyst.

* * * * *